United States Patent
Trivigno et al.

(10) Patent No.: US 10,557,209 B2
(45) Date of Patent: Feb. 11, 2020

(54) METHOD FOR OPTICALLY INSCRIBING AND/OR MARKING ROUND STOCK

(71) Applicant: Weber-Hydraulik GmbH, Gueglingen (DE)

(72) Inventors: Vincenzo Trivigno, Eberdingen (DE); Christian Schwab, Sternenfels (DE); Thorsten Brecht, Keltern (DE)

(73) Assignee: Weber-Hydraulik GmbH, Gueglingen (DE)

( * ) Notice: Subject to any disclaimer, the term of this patent is extended or adjusted under 35 U.S.C. 154(b) by 0 days.

(21) Appl. No.: 15/536,409

(22) PCT Filed: Dec. 21, 2015

(86) PCT No.: PCT/IB2015/059855
§ 371 (c)(1),
(2) Date: Jun. 15, 2017

(87) PCT Pub. No.: WO2016/098087
PCT Pub. Date: Jun. 23, 2016

(65) Prior Publication Data
US 2017/0362730 A1 Dec. 21, 2017

(30) Foreign Application Priority Data

Dec. 19, 2014 (DE) .......................... 10 2014 119 305
Oct. 26, 2015 (DE) .......................... 10 2015 118 254
(Continued)

(51) Int. Cl.
C25D 5/40 (2006.01)
C25D 5/02 (2006.01)
(Continued)

(52) U.S. Cl.
CPC ............... *C25D 5/022* (2013.01); *C25D 5/06* (2013.01); *C25D 5/36* (2013.01); *C25D 5/40* (2013.01);
(Continued)

(58) Field of Classification Search
None
See application file for complete search history.

(56) References Cited

U.S. PATENT DOCUMENTS

| 1,996,187 A | | 4/1935 | Barnhart | |
| 4,879,555 A | * | 11/1989 | Ichikawa | ............ F15B 15/2846 |
| | | | | 341/13 |

(Continued)

FOREIGN PATENT DOCUMENTS

| CH | 554756 | | 10/1974 | |
| DE | 3802872 | * | 8/1989 | ............... B44C 1/22 |

(Continued)

OTHER PUBLICATIONS

English translation of WO9806884 (Year: 1998).*
English translation of EP2048265 (Year: 2009).*
English translation of CH554756 (Year: 1974).*

*Primary Examiner* — Stefanie S Wittenberg
(74) *Attorney, Agent, or Firm* — Volpe and Koenig, P.C.

(57) ABSTRACT

A method for producing round stock (10) which is provided with at least one inscription and/or marking (16), at least the surface (12) of the round stock (10) consisting of a metallic material, in particular of chromium or steel, for example of hardened steel, chromium-plated steel or stainless steel. In order to improve this method such that disadvantages and shortcomings are avoided, the method includes the following steps: placing on the surface (12) at least one cover (20) which is adapted to the shape of the surface (12) and in particular has the inscription and/or marking (16), such that the region to be provided with the inscription and/or mark- (Continued)

ing (16) is not covered by the cover (20),—exposing the round stock (10) to a first electrolyte (30) together with the cover (20), material being removed from the surface (12) by said electrolyte in the region to be provided with the inscription and/or the marking (16) while producing depressions (14), and—exposing the round stock (10) together with the cover (20) and the depressions (14) not covered by the cover (20) to a second electrolyte (32) by which the depressions (14) are filled to produce the inscription and/or marking (16) which differs from the surface (12) optically, in particular with respect to color. The present invention also relates to round stock (10) which is manufactured from a metallic material, with the round stock being provided with a correspondingly produced inscription and/or marking (16).

11 Claims, 1 Drawing Sheet

(30) Foreign Application Priority Data

Oct. 30, 2015 (DE) .......... 10 2015 118 680
Nov. 5, 2015 (DE) .......... 10 2015 119 033

(51) Int. Cl.
*C25D 5/06* (2006.01)
*C25D 7/00* (2006.01)
*C25D 5/36* (2006.01)
*C25F 3/06* (2006.01)
*C25F 3/08* (2006.01)
*F15B 15/28* (2006.01)
*G06K 19/06* (2006.01)

(52) U.S. Cl.
CPC .......... *C25D 7/00* (2013.01); *C25F 3/06* (2013.01); *C25F 3/08* (2013.01); *F15B 15/2846* (2013.01); *G06K 19/06028* (2013.01)

(56) References Cited

U.S. PATENT DOCUMENTS

2009/0242410 A1* 10/2009 Castro .......... C25D 3/12
205/118
2014/0087204 A1* 3/2014 Shih .......... B32B 15/01
428/601

FOREIGN PATENT DOCUMENTS

| EP | 0405006 | 1/1991 |
| EP | 2048265 | 4/2009 |
| WO | 9806884 | 2/1998 |
| WO | 2009118412 | 10/2009 |

* cited by examiner

METHOD FOR OPTICALLY INSCRIBING AND/OR MARKING ROUND STOCK

TECHNICAL FIELD

The present invention relates to the technical field of inscribing and/or marking round stock, in particular piston rods that are provided for example for fluid cylinders such as for hydraulic cylinders and/or pneumatic cylinders.

BACKGROUND

It is possible by virtue of electrochemically or galvanically treating metal surfaces to oxidize, reduce, or etch said metal surfaces in a purposeful manner in conjunction with electrolyte solutions in order to change the characteristics of said metal surfaces.

It is possible by virtue of purposefully oxidizing the surface to achieve long-lasting colored regions on the surface. This method for providing an inscription and marking is mainly used on a small scale for inscribing small components.

A coating is applied as a special process of galvanic technology by means of the tampon-galvanic technique when marking metal surfaces; in particular the component that is to be coated is fixed at the minus pole or negative connection of a galvanic installation. The anode can be a plate that is encased by a wadding tampon or a rod that is embodied from a non-soluble material and is encased by a wadding tampon. The electrolyte solution can be supplied to this tool by way of a hose line; alternatively, the plate or the rod can be immersed together with the wadding tampon into an electrolyte bath.

The described electrochemical or galvanic process, in particular the tampon-galvanic process, can also be used inter alia on chromed surfaces and is used predominantly for cleaning, repairing coatings, for example a chrome layer, and also for inscribing or marking surfaces.

The long lasting colored inscriptions and/or markings on heavily stressed metal surfaces of round stock, for example on piston rods in fluid cylinders, such as for example hydraulic cylinders and/or pneumatic cylinders, can be provided in a conventional manner by laser beams, wherein in this case annealing colors are produced and/or material is removed from the surface of the round stock.

The thermal loading associated with laser treatment damages the material so that it is necessary to adopt expensive counter measures, for example in the form of special coatings on the components, in order to avoid excessive corrosion. Markings provided by laser treatment are also only partially resistant to mechanical loadings, in other words the surface of the round stock is only inadequately resistant to mechanical loadings. Long process times constitute a further disadvantage of laser treatment.

SUMMARY

In consideration of the outlined prior art, the object of the present invention is to further develop a method and a corresponding round stock so that the above-mentioned disadvantages and deficiencies are avoided.

This object is achieved by a method and also by a round stock with one or more features of the invention. Advantageous embodiments and expedient further developments of the present invention are described below and in the claims.

In accordance with the present invention, it is provided to use a selective galvanizing process to inscribe and/or mark round stock, in particular a piston rod, for example of a fluid cylinder, such as for example a hydraulic cylinder and/or a pneumatic cylinder.

This method in accordance with the present invention is cost-effective and achieved quickly. The corrosion resistance of the material that is to be inscribed and/or marked is not particularly impaired and is even improved as a result of the inscription and/or marking so that it is possible to forego a special coating and/or marking.

It is possible to provide the round stock with a colored and long-lasting inscription and/or marking by the electrochemical in particular galvanic marking process, for example by a tampon-galvanic process. In order to provide the inscription and/or marking on the round stock, the area of said round stock that is to be inscribed and/or marked is separated by at least one mask or template from the area that is not to be inscribed and/or marked.

It is possible to color the surface of the round stock in that the round stock is exposed at least to an electrolyte solution, either by immersion in said solution or by being passed over by at least one electrode that is immersed in the electrolyte. It is possible in this manner to provide an inscription and/or marking on a large scale; it is thus possible for example to also inscribe and/or mark large piston rods for example of a length up to approx. 4,500 millimeters.

In particular during the tampon-galvanic process, in which the anode
- in the form of at least one plate that is encased by at least one sponge, stocking, cloth, non-woven material or wadding tampon or
- in the form of at least one rod that is encased by at least one sponge, stocking, cloth, non-woven material or wadding tampon, can be formed from a material that is non-soluble with respect to the electrolyte by virtue of passing over the piston rod by an electrode in an electrolyte bath, material of the electrolyte as a second layer on the surface of the round stock, in particular of the piston rod, that has already been etched or initially coated.

It is possible by suitably selecting the coating material, in particular black chromate, black nickel, black rhodium, black ruthenium, copper-tin alloy, copper-tin-zinc alloy or gold, for example hard gold, to apply a contrasting pattern to the surface of the round stock, in particular to the piston rod, by virtue of the characteristics of said coating material.

The surface of the initially coated round stock, in particular of the initially coated piston rod, can also be prepared in conjunction with a previously performed etching process in such a manner that the second layer
- fuses with the first layer to form an atomic bond and/or
- the second layer does not change the surface geometry of the round stock, in particular of the piston rod.

It is thus possible to etch the surface in such a manner that said surface is roughened and material is applied so that depressions are formed. The second layer of black chromate, black nickel, black rhodium, black ruthenium, copper-tin alloy, copper-tin-zinc alloy or gold, for example hard gold, then compensates for the material that has been removed.

The present invention also includes a solution (=so-called inverse or inverted solution in the form of a galvanic bath), wherein the surface of the round stock, in particular of the piston rod, is coated with black chromate, black nickel, black rhodium, black ruthenium, copper-tin alloy, copper-tin-zinc alloy or gold, in particular hard gold, and the areas that are coated in this manner are then covered by the covering.

By virtue of etching the coated surface in the non-masked areas, in other words the areas that are not covered by the covering, the black chromate, black nickel, black rhodium, black ruthenium, copper-tin alloy, copper-tin-zinc alloy or gold are removed from the non-covered areas and the areas that are not dark are subsequently hard chromed.

In terms of a robust and resistant inscription and/or marking on the surface of the round stock, said inscription and/or marking should thus likewise be able to withstand mechanical influences caused by guide bands and seals in addition to withstanding chemical influences, weathering and UV radiation. The piston rod that is embodied from steel under the inscription and/or marking must also be protected from corrosion.

In order for the inscription and/or marking to be reliably detected by a sensor arrangement, the inscription and/or marking thus comprises in an expedient manner a high magnitude of contrast with respect to the surface that is in particular hard-chromed. It is possible for this purpose to coat the respective code areas in a preferred manner with black chrome. Black chrome appears almost black and is chemically and also mechanically resistant to external influences.

In order to produce precise inscriptions and/or markings, the areas that are not to be marked are masked, for example by a shrinkable material, such as for example by at least one shrinkable tube, or in the form of a lacquer, such as for example a protective lacquer, spray lacquer or dipping lacquer, or in the form of an ink or in the form of at least a hot-melt or hot-melt coating.

The exposed areas of the hard chrome layer can be treated and subsequently coated with black chrome in a galvanic process so that a uniform very dark colored layer is produced.

The advantages of the present invention are in particular:
the surface of the round stock is not disadvantageously changed in particular with regard to the corrosion resistance and/or smoothness of the surface;
a clearly contoured and long-lasting resistant inscription and/or marking is produced;
advantages with regard to process times and process and installation costs in particular with regard to methods for providing inscriptions and/or markings that are based on laser technology.

Finally, the present invention relates to a method in accordance with the above-mentioned type and/or the round stock in accordance with the above-mentioned type in the case of using an electrochemical process, in particular a galvanic process, to inscribe and/or mark a chrome surface and/or steel surface, in particular a stainless steel surface, on at least one piston rod for at least one fluid cylinder, in particular a hydraulic cylinder and/or pneumatic cylinder.

The following are thus to be regarded in particular as possible technical fields of application:
inscribing and marking round stock, in particular piston rods;
galvanically marking stainless steel surfaces and/or chrome surfaces on piston rods for fluid cylinders, in particular for hydraulic cylinders and/or pneumatic cylinders.

BRIEF DESCRIPTION OF THE DRAWINGS

As already mentioned above, there are different options of configuring and further developing the doctrine of the present invention in an advantageous manner. For this purpose, on the one hand, reference is made to claims that are subordinate to claim 1, on the other hand further configurations, features and advantages of the present invention are explained in detail hereinunder, inter alia with reference to the two exemplary embodiments illustrated in FIG. 1 and FIG. 2.

In the drawings.

Like or similar embodiments, elements or features are provided with identical reference numerals in FIG. 1 and in FIG. 2.

DETAILED DESCRIPTION OF THE PREFERRED EMBODIMENTS

In order to avoid superfluous repetitions, the explanations hereinunder with respect to the embodiments, features and advantages of the present invention—unless otherwise mentioned—relate to the two exemplary embodiments of the present invention illustrated with reference to FIG. 1 and FIG. 2.

Figure 1:
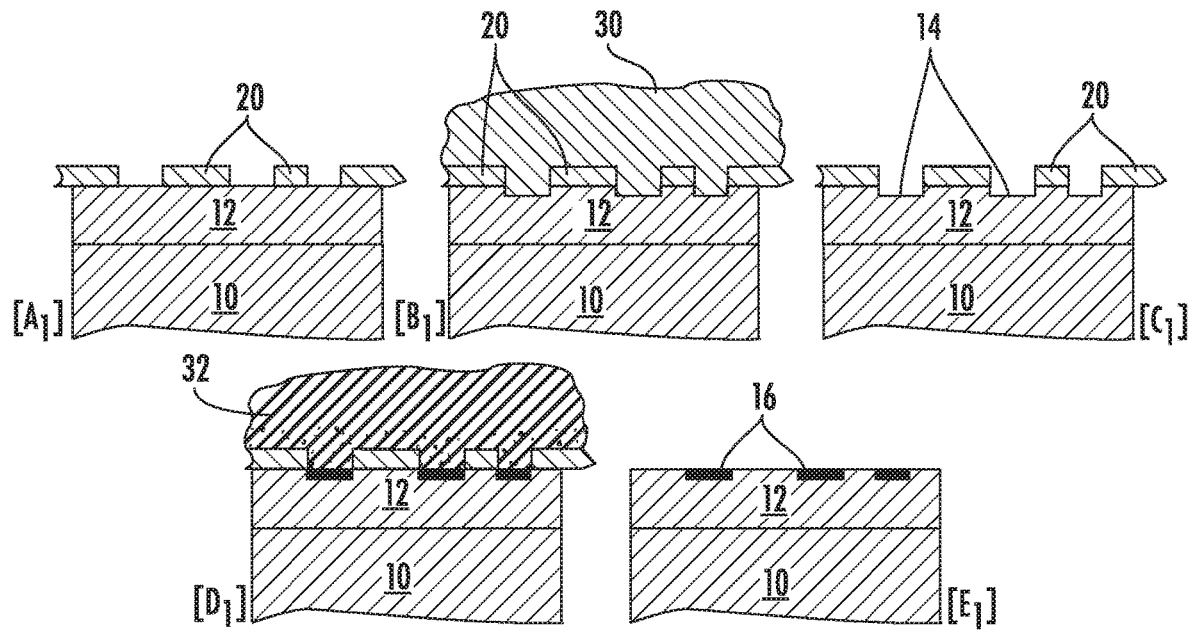
FIG. 1 illustrates in a schematic sequence (namely $[a_1] \rightarrow [b_1] \rightarrow [c_1] \rightarrow [d_1] \rightarrow [e_1]$) a first exemplary embodiment for a method in accordance with the present invention, wherein a method product in accordance with the present invention can be produced at the end of said method.
Figure 2:
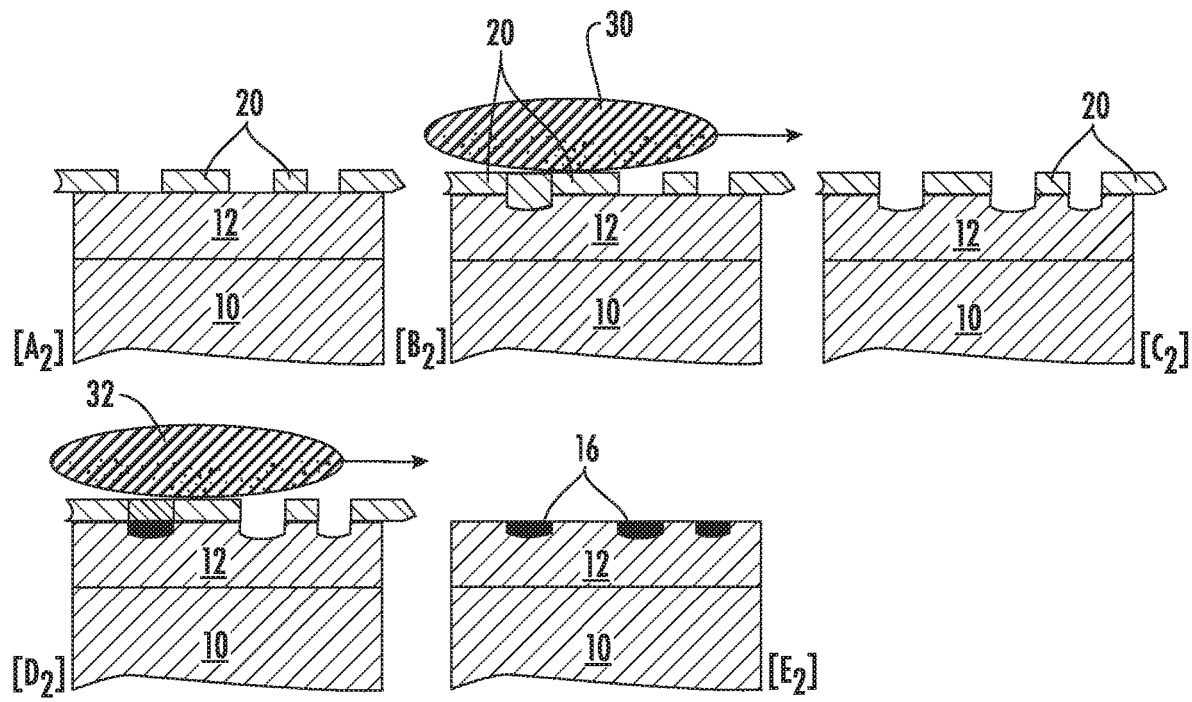
FIG. 2 illustrates in a schematic sequence (namely $[a_2] \rightarrow [b_2] \rightarrow [c_2] \rightarrow [d_2] \rightarrow [e_2]$) a second exemplary embodiment for a method in accordance with the present invention, wherein a method product in accordance with the present invention can be produced at the end of said method.

It is fundamentally possible by the method illustrated in an exemplary manner with reference to FIG. 1 or with reference to FIG. 2 to produce a round stock 10 that is provided with an inscription and/or marking 16 (cf. the method step $[e_1]$ in FIG. 1 or the method step $[e_2]$ in FIG. 2). The round stock 10 is in this case by way of example a piston rod of a fluid cylinder, in particular of a hydraulic cylinder and/or a pneumatic cylinder.

The starting point of the present invention is thus the round stock 10 that is embodied from a metal material, in particular from chrome or steel, for example from hardened steel, from chromed steel or stainless steel.

A covering 20 that is adapted to suit the form of the surface 12 of this round stock 10 and reveals the inscription and/or marking 16 is placed on the surface 12 in such a manner that the area of the surface 12 that is to be provided with the inscription and/or marking 16 is not covered by the covering 20 and the remaining area is covered by the covering 20 (cf. the method step $[a_1]$ in FIG. 1 or method step $[a_2]$ in FIG. 2).

There are different exemplary options for the design of the covering 20:
a mask that is embodied from a hard material, in particular from a synthetic material or from metal, having an additional seal between the mask and the surface 12;
a template, in particular from a foil that is self-adhesive and/or under tension;
a shrinkable material, in particular a shrinkable tube;
a lacquer (printed on the surface 12) in particular a protective lacquer, spray lacquer or dipping lacquer;
an ink (that is printed on the surface 12);
a hot-melt or hot-melt coating.

The round stock 10 having the covering 20 is exposed to a first electrolyte 30 (cf. the method step $[b_1]$ in FIG. 1 or the method step $[b_2]$ in FIG. 2).

Material is removed from the surface 12 by this first electrolyte 30 by forming depressions 14 in the area that is to be provided with the inscription and/or marking 16 (cf.

the method step [c₁] in FIG. 1 or the method step [c₂] in FIG. 2); in particular the depressions 14 are etched by the first electrolyte 30 into the areas of the surface 12 that are not covered by the covering 20 and are to be provided with the inscription and/or marking 16.

The round stock 10 having the covering 20 and having the depressions 14 that are not covered by the covering 20 is exposed to a second electrolyte 32 (cf. the method step [d₁] in FIG. 1 or the method step [d₂] in FIG. 2].

The depressions 14 that are provided so as to form the inscription and/or marking 16 that is optically different, in particular a different color, to the surface 12 are filled by this second electrolyte 32 (cf. the method step [e₁] in FIG. 1 or the method step [e₂] in FIG. 2. As a result, it is possible to fill the depressions 14 with black chrome, black nickel, black rhodium, black ruthenium, copper-tin alloy, copper-tin-zinc alloy or with gold, in particular hard gold.

The inscription and/or marking 16 can be formed by a code, in particular a barcode or bar code, for example by a continuous biunique binary barcode or bar code. For the purpose of optical position determination and/or path measurement, the code comprises an absolute code structure that represents the actual stroke or the actual position of the round stock.

There are various options with respect to supplying the first electrolyte 30 and/or the second electrolyte 32:

In the first exemplary embodiment in accordance with FIG. 1, the round stock 10 is placed or immersed in a bath or a solution of the first electrolyte 30 and/or the second electrolyte 32.

In the second exemplary embodiment in accordance with FIG. 2, the round stock 10 having the covering 20 is coated in the arrow direction in the tampon-galvanic process at least in the area of the surface 12 that is not covered by the covering 20 by an electrode that is supplied with the first electrolyte 30, with the first electrolyte entering the opening in the covering 20 being indicated as 30', and/or with the second electrolyte 32, indicated as 32' where it enters the opening in the covering 20 and into the depression 14 to form the inscription or marking 16, for example by way of a hose line, said electrode being in particular an electrode that is immersed in the first electrolyte 30 and/or in the second electrolyte 32.

In so doing, the electrode that is functioning as an anode is embodied from a material that is non-soluble with respect to the electrolyte as at least one plate that is encased by at least one sponge, stocking, cloth, non-woven material or wadding tampon or as at least one rod that is encased by at least one sponge, stocking, cloth, non-woven material or wadding tampon.

LIST OF REFERENCE NUMERALS

10 Round stock, in particular piston rod
12 Surface of the round stock 10
14 Depression in the surface 12
16 Inscription and/or marking
20 Cover, in particular a mask or template
30 First electrolyte
30' First electrolyte in cover opening
32 Second electrolyte
32' Second electrolyte in cover opening and depression 14

The invention claimed is:

1. A method for applying an inscription or for applying a marking (16) in the form of a code on a piston rod (10) of a fluid cylinder, wherein at least a surface (12) of the piston rod (10) is chrome or steel, the method comprising:

placing at least one covering (20) on the surface (12), the at least one covering having openings for the at least one of the inscription or marking (16) to be placed on the chrome or steel surface (12) such that an area that is to be provided with the at least one of the inscription or marking (16) is not covered by the covering (20), exposing the piston rod (10) having the covering (20) to a first electrolyte (30) by which material is removed from the chrome or steel surface (12) by forming depressions (14) in the area that is to be provided with at least one of the at least one of the inscription or marking (16), and exposing the piston rod (10) having the covering (20) and having the depressions (14) that are not covered by the covering (20) to a second electrolyte (32) by which the depressions (14) are filled by black chrome or black nickel in a galvanic process so as to form a finished inscription or marking (16) that is optically distinguishable from and flush with the chrome or steel surface (12).

2. The method as claimed in claim 1, wherein the covering (20) is formed by at least one mask that is embodied from a hard material having an additional seal between the mask and the surface (12) or by at least one template that is at least one of self-adhesive or tensioned against the surface (12), or by a material that is shrunk against the surface (12).

3. The method as claimed in claim 1, wherein the covering (20) comprises at least one hot-melt or hot-melt coating.

4. The method as claimed in claim 3, wherein the covering (20) is printed onto the surface (12).

5. The method as claimed in claim 1, wherein the depressions (14) are etched by the first electrolyte (30) into regions of the surface (12) that are not covered by the covering (20) and are to be provided with the at least one of the inscription or marking (16).

6. The method as claimed in claim 1, further comprising placing or immersing the piston rod (10) having the covering (20) in at least one bath or at least one solution of at least one of the first electrolyte (30) or the second electrolyte (32).

7. The method as claimed in claim 1, wherein the piston rod (10) having the covering (20) is coated using a tampon-galvanic process at least in the area of the surface (12) that is not covered by the covering (20) by an electrode that is supplied with at least one of the first electrolyte (30) or the second electrolyte (32), said electrode being immersed in the at least one of the first electrolyte (30) or the second electrolyte (32).

8. The method as claimed in claim 7, wherein the electrode that is functioning as an anode is embodied from a material that is non-soluble with respect to the electrolyte as at least one plate that is encased by at least one sponge, stocking, cloth, non-woven material or wadding tampon, or as at least one rod that is encased by at least one sponge, stocking, cloth, non-woven material or wadding tampon.

9. The method as claimed in claim 1, wherein the marking (16) comprises at least one barcode.

10. The method as claimed in claim 1, wherein the fluid cylinder is a hydraulic cylinder or a pneumatic cylinder.

11. The method as claimed in claim 9, wherein the code is for optical position determination or path measurement, and comprises a code structure that represents the actual stroke or the actual position of the piston rod.

\* \* \* \* \*